US008189068B2

(12) United States Patent
Kim

(10) Patent No.: US 8,189,068 B2
(45) Date of Patent: May 29, 2012

(54) APPARATUS AND METHOD FOR DETECTING FLICKER NOISE AND COMPUTER READABLE MEDIUM STORED THEREON COMPUTER EXECUTABLE INSTRUCTIONS FOR PERFORMING THE METHOD

(75) Inventor: Min-Seok Kim, Seoul (KR)

(73) Assignee: Core Logic, Inc., Seoul (KR)

( * ) Notice: Subject to any disclaimer, the term of this patent is extended or adjusted under 35 U.S.C. 154(b) by 1048 days.

(21) Appl. No.: 12/152,898

(22) Filed: May 16, 2008

(65) Prior Publication Data

US 2008/0291291 A1 Nov. 27, 2008

(30) Foreign Application Priority Data

May 16, 2007 (KR) ........................ 10-2007-0047530

(51) Int. Cl.
*H04N 9/73* (2006.01)
*H04N 11/04* (2006.01)
(52) U.S. Cl. ..................................... 348/226.1; 348/447
(58) Field of Classification Search ................ 348/226.1, 348/447
See application file for complete search history.

(56) References Cited

U.S. PATENT DOCUMENTS

2006/0279641 A1* 12/2006 Takahashi et al. ......... 348/226.1
2007/0153094 A1* 7/2007 Noyes et al. ............... 348/226.1

* cited by examiner

*Primary Examiner* — Jason Chan
*Assistant Examiner* — Joel Fosselman
(74) *Attorney, Agent, or Firm* — Edwards Wildman Palmer LLP

(57) ABSTRACT

An apparatus for detecting flicker noise disclosed in the present invention comprises an output unit for outputting a standard data for flicker noise judgment using a statistical calculation value for each calculated line based on brightness information of pixels for each line of an object image for flicker noise detection; a flicker line detection unit for detecting flicker lines, namely, lines corresponding to the standard data where the distance between the lines are within a predetermined allowance of a regular interval; and a judgment unit for comparing the number of the detected flicker lines with a standard number for flicker noise judgment to judge if the object image is a flicker noise image.

The present invention can realize a method for detecting flicker noise, in which an image obtained with the reduced calculation time and use of a minimum memory has a robust in characteristics of a subject.

21 Claims, 7 Drawing Sheets

APPARATUS AND METHOD FOR DETECTING FLICKER NOISE AND COMPUTER READABLE MEDIUM STORED THEREON COMPUTER EXECUTABLE INSTRUCTIONS FOR PERFORMING THE METHOD

CLAIM OF PRIORITY

This application claims priority under 35 USC §119(a) to Korean Patent Application No. 10-2007-0047530, filed on May 16, 2007, in the Korean Intellectual Property Office, the entire contents of which are hereby incorporated by reference.

TECHNICAL FIELD

The present invention relates to apparatus and method for detecting flicker noise, and in particular, to apparatus and method for detecting flicker noise simply and effectively through statistical regularity of brightness information among image information of a pixel.

BACKGROUND

Flicker noise is a kind of noise caused by frequency mismatching when a subject is taken with an optical imaging device such as a camera in the lighting state of a fluorescent lamp adapted to be powered by an alternating current. Changes in black and white with time occur to an outputted image signal due to a difference between a luminance change frequency of the fluorescent lamp and a vertical synchronous frequency of the camera.

For example, in the case that a subject is taken with a CCD (Charge-Coupled Device) camera of an NTSC (National Television System Committee) mode (a vertical synchronous frequency is 60 Hz) in a light source of a fluorescent lamp of a non-inverter mode at a region where frequency of an alternating current is 50 Hz, because 1 cycle is $\frac{1}{60}$ seconds but a luminance change cycle of the fluorescent lamp is $\frac{1}{100}$ seconds, as changes in luminance of the fluorescent lamp make exposure timing of each field incorrect, which varies an exposure amount of each pixel.

In other words, a CMOS (Complementary Metal-Oxide-Semiconductor) image sensor used in an optical imaging device has a simple structure, is inexpensive, and allows high image quality and low power consumption. However, the CMOS image sensor has different timing for changing photoelectricity each pixel or line, and thus, in the case that a subject is taken in an environment where luminance changes cyclically, such as a fluorescent lamp, horizontal lines of black and white appears in an image. The horizontal lines are referred to as flicker or flicker noise.

Many methods for detecting flicker noise have been suggested, and mainly include a method for treating at a spatial area and a method for treating at a frequency area. The method for treating at a spatial area detects flicker noise components using a correlation with adjacent pixels, intervals between lines, or frames, and the method for treating at a frequency area detects flicker noise components using transform such as FFT (Fast Fourier Transform) or cepstrum.

The method for detecting flicker noise at a frequency area allows more accurate detection than the method for detecting flicker noise at a spatial area, however it requires too much hardware resources and memories to be incorporated into an embedded device or a chip.

On the other side, the method for detecting flicker noise at a spatial area using a correlation with adjacent pixels, intervals between lines, or frames has an increasing possibility of error in flicker noise detection according to noise components because of exposure to noise included in image information. Further, this method requires a memory for each line or frame to compare information of a current line with information of a next line.

SUMMARY

The present invention was devised to solve the above-mentioned problems. An object of the present invention is to provide apparatus and method for detecting flicker noise accurately and simply without a frame memory or a line memory.

And, another object of the present invention is to provide a computer readable medium stored thereon computer executable instructions for performing the method.

These and other features, aspects, and advantages of the present invention will be more fully described in the preferred embodiments of the present invention. And, the objects and advantages of the present invention can be implemented by configurations recited in the claims singularly or in combination.

To achieve the above-mentioned objects, an apparatus for detecting flicker noise comprises an output unit for outputting a standard data for flicker noise judgment using a statistical calculation value for each line that is calculated based on brightness information of pixels for each line of an object image for flicker noise detection; a flicker line detection unit for detecting flicker lines by identifying lines corresponding to the standard data where the distance between the lines are within a predetermined allowance of a regular interval; and a judgment unit for comparing the number of detected flicker lines with the standard number for flicker noise judgment to judge if the object image is a flicker noise image.

Through the above-mentioned configuration, the apparatus for detecting flicker noise can detect flicker noise simply without a memory for each line or frame.

And, the output unit may include a first output unit for outputting a first data for each line of the object image, where the first data is a statistical calculation value of brightness information of pixels corresponding to one line in the object image; and a standard data output unit for outputting a standard data, where the standard data is a first data greater than a first data of a previous line and greater than a first data of a next line among the first data.

Through the above-mentioned configuration, the apparatus for detecting flicker noise can judge a more accurate flicker noise image based on a line having a statistical meaning of a substantial flicker line.

Meanwhile, the output unit further includes a filtering unit for low-pass filtering the first data for each line, and preferably, the standard data output unit outputs a standard data, namely, a second data greater than a second data of a previous line and greater than a second data of a next line where a second data is the low-pass filtered first data.

Through the above-mentioned configuration, the apparatus for detecting flicker noise can exclude in advance an error according to characteristics of a subject of an image, thereby judging a more accurate flicker noise image.

And, preferably, the first output unit outputs the first data, namely, the statistical calculation value using brightness information of all pixels corresponding to one line.

Through the above-mentioned configuration, the apparatus for detecting flicker noise can minimize the influence that may be affected from characteristics of a subject in image data.

And, the statistical calculation value may be a value obtained by dividing the sum of brightness information of pixels corresponding to one line in the object image by a number that is selected from numbers ranging from '1' to the number of pixels corresponding to one line.

Through the above-mentioned configuration, the apparatus for detecting flicker noise can flexibly adjust the statistical calculation value such that the statistical calculation value is distinctive each line in the flicker noise detection.

Further, preferably, the filtering unit performs a low-pass filtering using six to eight of first data for each line. Through the above-mentioned configuration, the apparatus for detecting flicker noise can exhibit the most preferable efficiency in a flicker noise detection rate in aspect of a calculation speed and use of a memory.

And, the standard number corresponds to 60% or more of a value obtained by dividing the height of an input image by a size of an interval between flicker lines, so that a flicker noise detection can be realized, on which ideal substantial optical characteristics and an image processing step are reflected.

Meanwhile, in the case that the intervals between flicker lines are not equal to each other, the size of the interval may be an average value of nonequal intervals between flicker lines, or a size of an interval corresponding to the most frequent interval.

Further, in the case that the intervals between flicker lines are not equal to each other, the number of flicker lines compared with the standard number may be the sum of the number of flicker lines having nonequal intervals or the most number of flicker lines among the flicker lines having nonequal intervals.

Meanwhile, a method for detecting flicker noise according to another aspect of the present invention comprises an output step for outputting a standard data for flicker noise judgment using a statistical calculation value for each line that is calculated based on brightness information of pixels for each line of an object image for flicker noise detection; a flicker line detection step for detecting flicker lines, namely, lines corresponding to the standard data where the distance between the lines are within a predetermined allowance of a regular interval; and a judgment step for comparing the number of detected flicker lines with a standard number for flicker noise judgment to judge if the object image is a flicker noise image.

Through the above-mentioned configuration, the method for detecting flicker noise can detect flicker noise simply and minimize the time and space.

BRIEF DESCRIPTION OF THE DRAWINGS

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

DETAILED DESCRIPTION

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Figure 1:
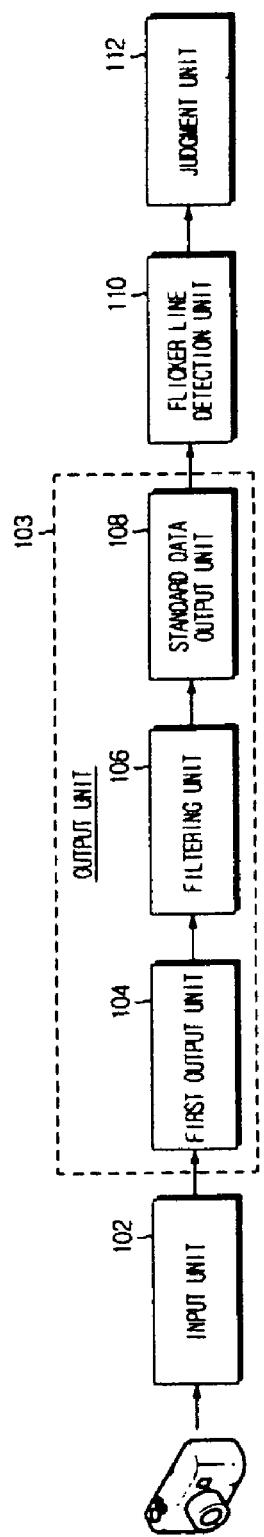
FIG. 1 is a block diagram illustrating an apparatus for detecting flicker noise according to a preferred embodiment of the present invention.
Figure 2:
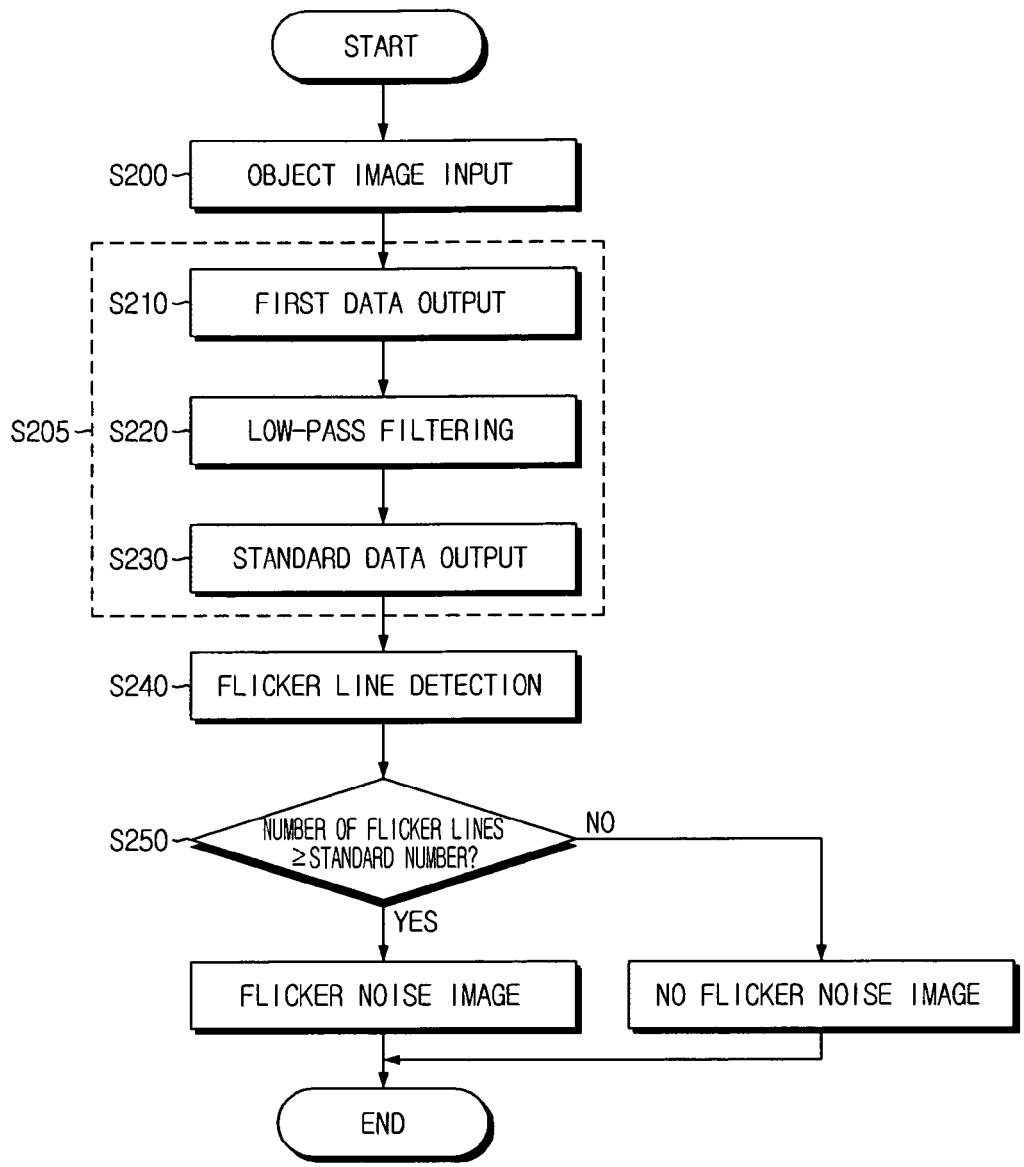
FIG. 2 is a flow chart illustrating a method for detecting flicker noise according to a preferred embodiment of the present invention.

FIG. 1 is a block diagram illustrating an apparatus for detecting flicker noise according to a preferred embodiment of the present invention. FIG. 2 is a flow chart illustrating a method for detecting flicker noise according to a preferred embodiment of the present invention.

Referring to FIG. 1, the apparatus 100 for detecting flicker noise according to the present invention comprises an input unit 102, an output unit 103, a flicker line detection unit 110, and a judgment unit 112. And, the output unit 103 includes a first output unit 104, a filtering unit 106, and a standard data output unit 108.

The input unit 102 of the present invention receives input of an object image for flicker noise detection (S200). Typically, according to an image signal process, an image taken with an optical imaging device such as an image sensor is gone through gamma correction, color correction, and YCbCr conversion according to necessity. The object image processed as mentioned above is inputted into the input unit 102.

The input unit 102 realizes an interface function between the apparatus 100 of the present invention and an external apparatus or another apparatus existing outside.

It is well known that image information expressed as various color spaces can be converted into another color space by a simple mathematical equation. Thus, it should be understood that the present invention is applicable to various image information expressed as another color space in the same way as brightness information (Y among YCbCr) used as a specific example.

Image includes a plurality of pixels of a predetermined matrix arrangement consisted of rows and columns, and in an image processing, the image is inputted with time series characteristics from a left upper pixel to a right lower pixel. In the present invention, 320×240 image is cited as an example of an applicable image frame.

Hereinafter, a configuration expressed as a line corresponds to a column in an image. The 320×240 image has 240 lines.

The object image inputted through the input unit 102 as mentioned above is transmitted to the output unit 103, and the output unit 103 outputs a standard data for flicker noise judgment using a statistical calculation value for each line that is calculated based on brightness information of pixels for each line of the object image for flicker noise detection.

An image with flicker noise has distinctive characteristics each line in aspect of brightness of a pixel. Such a physical phenomenon is reflected on the image. Accordingly, the output unit 103 calculates a statistical calculation value using brightness information of pixels for each line of the object image, and outputs the distinctive statistical calculation value each line.

The outputted statistical calculation value for each line may have characteristics of a subject of an original image, and thus, to sort the statistical calculation value to judge flicker noise, the output unit 103 outputs a standard data for flicker noise judgment using the statistical calculation value of brightness information having at least a predetermined brightness and cyclic characteristics (S205).

The standard data outputted as mentioned above is used to judge a flicker noise image in subsequent processes of the flicker line detection unit 110 and judgment unit 112 to be mentioned below. The flicker line detection unit 110 and judgment unit 112 are described in detail after description of elements of the output unit 103.

The first output unit 104 of the output unit 103 outputs a first data for each line of the object image, where the first data is the statistical calculation value of brightness information of pixels corresponding to one line in the object image inputted though the input unit 102 (S210).

In the above-mentioned example, each of 240 lines has 320 pixels and each pixel has image information expressed as various color spaces. In the case that a color space is YCbCr, the image information includes information for each of Y, Cb and Cr. The first output unit 104 outputs a statistical calculation value of brightness information of pixels corresponding to Y among the image information.

Meanwhile, in the case that a color space is RGB, the color space may be converted into YCbCr by a simple mathematical equation as mentioned above. Thus, it should be understood that the first output unit 104 is applicable without limitations on color space.

In other words, the first output unit 104 outputs a statistical calculation value for each of 240 lines. In this output step, the first output unit 104 may use brightness information of all of 320 pixels corresponding to one line or brightness information of pixels corresponding to a selected area. In the case that the first output unit 104 extracts only a characteristic portion of an image and outputs a statistical calculation value using pixels corresponding the extracted characteristic portion, it may be effective in aspect of use of a memory or a calculation speed, however it is difficult to reflect general characteristics of a subject and characteristics of flicker noise in the image.

As mentioned above, it is possible to select a specific pixel area corresponding to one line and output a statistical calculation value using the selected specific pixel area according to use environment or image characteristics. However, it is preferable to select all pixels corresponding to one line and output a statistical calculation value using all the pixels in aspect of efficiency of flicker noise detection in consideration of characteristics of a subject.

The statistical calculation value may be generally an average value, and various modifications and variations may be made, for example a weighted average value calculated by multiplying selected pixels by weight values.

And, the statistical calculation value may be determined as a value obtained by dividing the sum of brightness information of pixels corresponding to one line in the object image by a number that is selected from numbers ranging from '1' the number of pixels corresponding to one line.

The sum of brightness information of pixels corresponding to each line may be used as the first data, namely, the statistical calculation value, and in this case, the statistical calculation value may have the most distinctive feature each line. As the sum is divided by a larger value, a distinctive feature for each line may be reduced.

Preferably, the above-mentioned configuration can be manually or automatically adjusted by a user or in the apparatus according to the calculated result. In the case that the number of pixels corresponding to one line is selected, the statistical calculation value is an average value of brightness information of one line.

Figure 3:
FIG. 3 is a view illustrating an object image and a statistical calculation value of brightness information for each line in the object image.

FIG. 3 is a view illustrating an object image and a statistical calculation value of brightness information for each line in the object image. In FIG. 3, a statistical calculation value (average value) of a brightness value of each line from a first line to the last line is indicated at the right side of the object image.

Figure 4:
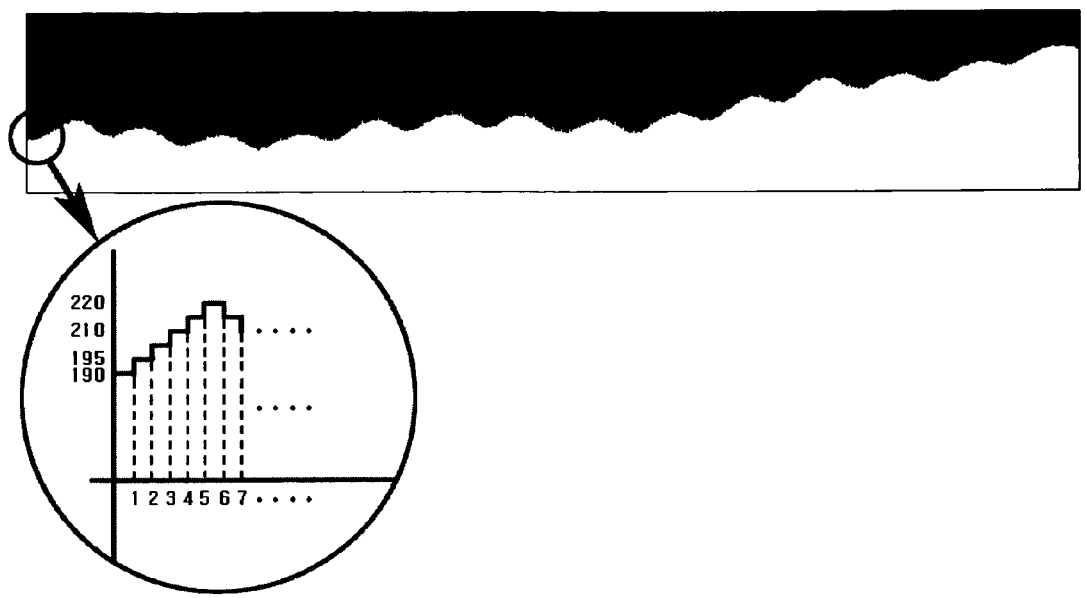
FIG. 4 is a view illustrating the statistical calculation value of brightness information for each line of the object image in a coordinate system.

FIG. 4 is a view illustrating the statistical calculation value as a coordinate system after rotation of the statistical calculation value of brightness information for each line of the object image of FIG. 3. In FIG. 4, results consisted of first data values corresponding to characteristics for each line of the object image are shown in two dimensions, wherein an X axis corresponds to lines of the object image (from an upper line to a lower line with regard to the origin) and a Y axis corresponds to the statistical calculation value (first data).

As shown in a partially enlarged view of FIG. 4, the average value corresponds to a discrete value, and to improve the visual recognition, the average value was expressed as brightness information corresponding to each statistical calculation value. On the whole, the average value is viewed in a wavy shape.

Figure 5A:
FIGS. 5a and 5b are views illustrating a low-pass filtering step of the statistical calculation value.
Figure 5B:

The filtering unit 106 of the present invention performs a low-pass filtering on the first data for each line (S220). FIGS. 5a and 5b are views illustrating the first data before and after filtering, respectively.

As shown in FIG. 5a, the first data before filtering does not have a continuous distribution due to noise occurring by various causes, and does not exhibit statistical characteristics of the image. Thus, a low-pass filtering is performed on the first data to stand out general statistical characteristics of the image.

Various filtering methods can be applied to the low-pass filtering, however preferably, mean filtering is used to reflect most effectively image characteristics for each line. That is, the low-pass filtering uses a filtering method for replacing a first data of a corresponding line with an average value of first data for each line.

Specifically, the filtering by an average value is performed such that a value of a first data of $n^{th}$ line is replaced with an average value of a first data of $n-1^{th}$ line, a first data of $n^{th}$ line and a first data of $n+1^{th}$. It is preferable to perform a filtering using six to eight of first data in aspect of characteristics of an image and time or memory required for calculation.

The first data after the above-mentioned filtering is shown in FIG. 5b.

After the above-mentioned step, the standard data output unit 108 outputs a standard data, namely, a second data greater than a second data of a previous line and greater than a second data of a next line where the second data is the low-pass filtered data (S230).

The standard data is data corresponding to a portion where a tangent line slopes from positive to negative in a curve of first data shown in FIG. 4. The standard data is calculated using a difference between a value of a first data of $n^{th}$ line and a value of a first data of $n+1^{th}$ line. The standard data output unit 108 can output a standard data, namely a first data greater than a first data of a previous line and greater than a first data of a next line. For reflecting substantial characteristics of image, the standard data output unit 108 as mentioned above can output a standard data utilizing the second data where the second data is the low-pass filtered first data.

Figure 6A:
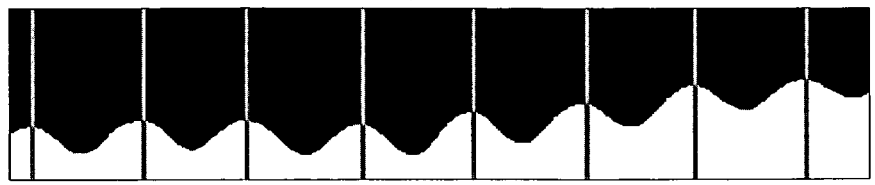
FIGS. 6a and 6b are views illustrating a standard data of a low-pass filtered second data.
Figure 6B:
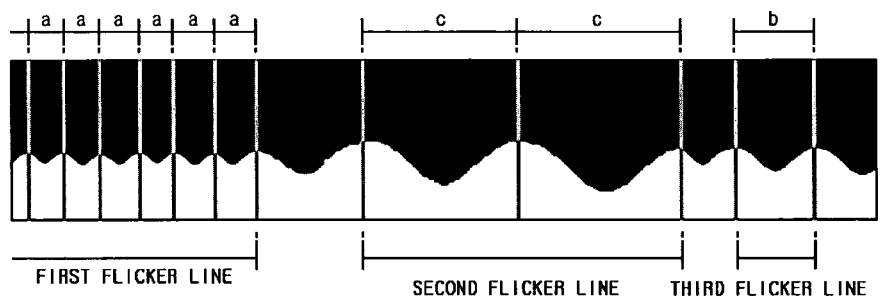

FIGS. 6a and 6b are views illustrating a line having a standard data of the low-pass filtered second data as a curve.

Next, the flicker line detection unit 110 outputs flicker lines, namely, lines corresponding to standard data where the distance between the lines are within a predetermined allowance of regular intervals (S240).

The allowance is a range set by a user or a preset value. A physically exactly equal interval is impossible, and it is preferable to set an allowance. Various modifications or variations may be made according to environment of the apparatus or image characteristics.

As mentioned above, the flicker noise occurs due to a physical phenomenon by mismatching between cyclic characteristics of a light source toward a subject and a light sensing cycle of a light sensor. Accordingly, the flicker noise has regular cyclic characteristics.

An area with flicker noise has a lower brightness value than an area without flicker noise, and thus the flicker noise is based on optical characteristics that a cyclic phenomenon appears in an image, in which the brightness value gets higher again at a point where noise disappears.

For example, assuming that lines having first to tenth standard data are 20, 40, 60, 81, 100, 122, 125, 132, 140 and 160, and an allowance is ±2, the first line (20), second line (40), third line (60), fourth line (81), fifth line (100), sixth line (122), ninth line (140) and tenth line (160) correspond to flicker lines, and the other lines correspond to lines appearing according to characteristics of a subject in an image.

After the flicker lines are detected, the judgment unit 112 compares the number of the flicker lines with a standard number for flicker noise judgment to judge if the object image is a flicker noise image (S250).

The standard number for flicker noise judgment may be set as an absolute value based on a size of the input image, frequency of the light source or frequency of the image sensor, and through various experimental examples, the standard number may be set based on a statistical value of flicker lines in the case that flicker noise exists.

And, the standard number may be set as a relative value depending on the height of the input image such that the standard number corresponds to 60% or more of a value obtained by dividing the height of the input image by a size of an interval between flicker lines.

For the previous example, wherein an interval between the flicker lines is '20' and the height of the image is '240', in an ideal case, when the number of the flicker lines is 12 or more with 20/240=12 as a standard number, the object image may be judged as a flicker noise image. However, it is preferable to set the standard number as a value (7.2) corresponding to 60% or more of the above-mentioned value (12) in a substantial environment where various factors of an image processor are reflected.

Due to characteristics of an image, there may exist a flicker line that intervals between lines are regular within a predetermined allowance but the regular intervals are not equal to each other. As shown in FIG. 6b, the flicker line includes a first flicker line group, a second flicker line group and a third flicker line group.

In this case, in obtaining the standard number, the size of the interval of flicker lines used to divide the height value of the input image may be set as an average value of sizes of intervals between flicker lines having nonequal intervals or a size of an interval corresponding to the most frequent interval.

The latter reflects a substantial meaning of a flicker line, but requires a calculation for arranging according to size, and thus it spends a longer calculation time. The former may have opposite advantages to the latter.

In the point of view similar to the above-mentioned context, in the case that intervals between flicker lines are not equal to each other, the number of flicker lines compared with the standard number for flicker noise judgment may be set as the sum of the number of flicker lines having nonequal intervals or as the most number among flicker lines having nonequal intervals.

Figure 7A:
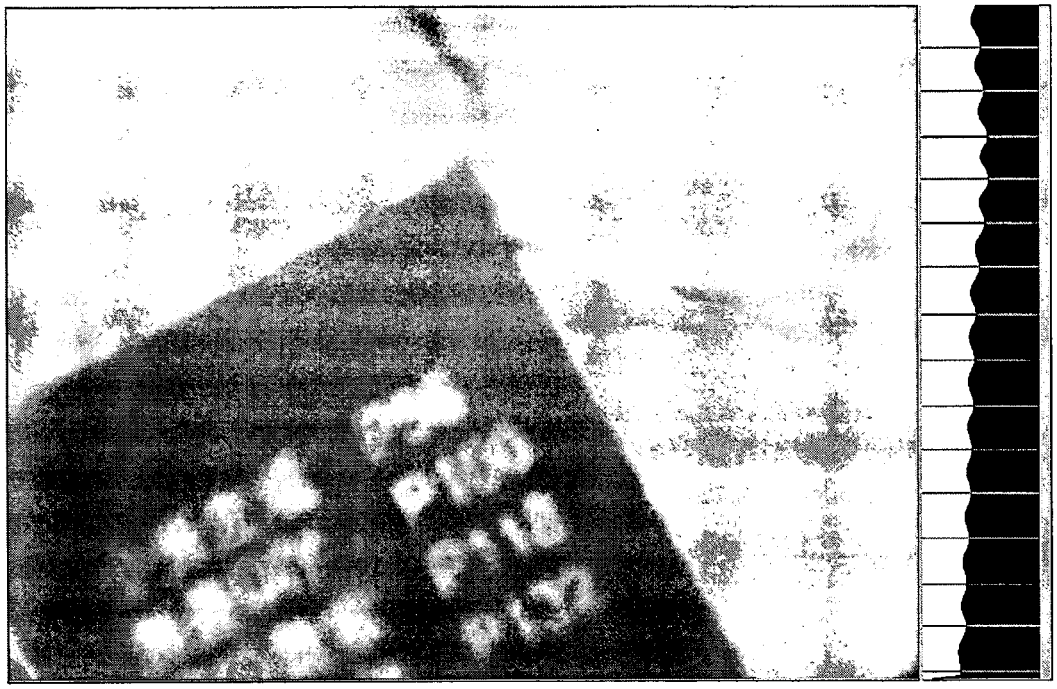
FIGS. 7a and 7b are views illustrating the resultant images passed through a flicker noise image judgment step by the present invention.
Figure 7B:

FIG. 7a shows an example of an image with flicker noise detected by the method of the present invention, and 7b shows an image without flicker noise.

Unlike the conventional method that requires a line memory for storing data for each line of an input image or a frame memory for storing frame data, the apparatus and method for detecting flicker noise according to the present invention perform all calculations using a statistical calculation value (average value) of a line, and thus eliminate the need for storing data of all lines.

The calculation of the present invention is not based on a comparison between lines including a plurality of pixels or a comparison between frames, but a statistical calculation value for each line. Thus, a storage space can be minimized, and accordingly, in the case that it is incorporated into a chip, economical and spatial utility can be improved.

That is, the present invention requires a memory space for calculating an average value of one line, and after calculation of the average value, stores an average value of a next line into a space where an average value of a previous line was stored. Therefore, the present invention has a remarkably better economical utility than the conventional flicker detection method.

The method for detecting flicker noise according to the present invention may be incorporated as a computer readable code in a computer readable medium. The computer readable medium includes all kinds of storage devices for storing data readable by a computer system. For example, the computer readable medium is ROM, RAM, CD-ROM, a magnetic tape, a floppy disc or an optical data storage device, and may be incorporated in the form of a carrier wave (for example, transmission via the Internet). And, the computer readable medium may store and execute a code that is dispersed in computer systems connected to each other via a network and is readable by a computer through a dispersion method. Further, function program, code and code segments for implementing the method for reducing image noise with filter matrix may be easily inferred by programmers in the prior art.

Only a few implementations and examples are described and other implementations, enhancements and variations can be made based on what is described and illustrated in this application.

The present invention provides apparatus and method for detecting flicker noise can detect flicker noise image simply and rapidly.

And, in judging flicker noise, the present invention does not use wholly image information for each frame or line, but only a statistical calculation value such as an average value using brightness information of data for each line. Therefore, the present invention can realize a method for judging a flicker noise image economically and effectively without a line memory or a frame memory.

What is claimed is:

1. An apparatus for detecting flicker noise, comprising:
    an output unit for outputting a standard data for flicker noise judgment using a statistical calculation value for each line where the statistical calculation values are calculated based on brightness information of pixels for each line of an object image, and which include a first output unit for outputting a first data for each line of the object image, where the first data is a statistical calculation value of brightness information of pixels corresponding to one line in the object image, and a filtering unit for low-pass filtering the first data for each line;
    a flicker line detection unit for detecting flicker lines by identifying lines corresponding to the standard data where the distance between the lines are within a predetermined allowance of a regular interval; and
    a judgment unit for comparing the number of the detected flicker lines with a standard number for flicker noise judgment to judge if the object image is a flicker noise image,
    wherein the filtering unit performs a low-pass filtering only for each of the first data corresponding to lines of a predetermined number from among lines forming the object image,
        wherein the standard number corresponds to 60% or more of a value obtained by dividing a height of the object image by a size of an interval between flicker lines.

2. The apparatus for detecting flicker noise according to claim 1,
    wherein the output unit includes:
    a standard data output unit for outputting a standard data, where the standard data is a first data greater than a first data of a previous line and greater than a first data of a next line among the first data.

3. The apparatus for detecting flicker noise according to claim 2,
    wherein the standard data output unit outputs a standard data, namely, a second data greater than a second data of a previous line and greater than a second data of a next line where a second data is the low-pass filtered first data.

4. The apparatus for detecting flicker noise according to claim 3, wherein the filtering unit performs a low-pass filtering for each of the first data corresponding to at least six to eight lines among lines forming the object image.

5. The apparatus for detecting flicker noise according to claim 2,
    wherein the first output unit outputs the first data using brightness information of all pixels corresponding to one line.

6. The apparatus for detecting flicker noise according to claim 1,
    wherein the statistical calculation value is a value obtained by dividing the sum of brightness information of pixels corresponding to one line in the object image by a number that is selected from numbers ranging from '1' to the number of pixels corresponding to one line.

7. The apparatus for detecting flicker noise according to claim 1,
    wherein, in the case that the intervals between the flicker lines are not equal to each other, the size of the interval between flicker lines is an average value of sizes of intervals between flicker lines having non-equal intervals.

8. The apparatus for detecting flicker noise according to claim 1,
    wherein, in the case that the intervals between flicker lines are not equal to each other, the size of the interval between flicker lines is the size of the most frequent interval.

9. The apparatus for detecting flicker noise according to claim 1,
    wherein, in the case that the intervals between flicker lines are not equal to each other, the number of flicker lines compared with the standard number is the sum of the number of flicker lines having nonequal intervals.

10. The apparatus for detecting flicker noise according to claim 1,
    wherein, in the case that the intervals between flicker lines are not equal to each other, the number of flicker lines compared with the standard number is the number of the flicker lines having most frequent interval.

11. A method for detecting flicker noise, comprising:
    an output step for outputting a standard data for flicker noise judgment using a statistical calculation value for each line where the statistical calculation values are calculated based on brightness information of pixels for each line of an object image;
    a flicker line detection step for detecting flicker lines by identifying lines corresponding to the standard data where the distance between the lines are within a predetermined allowance of a regular interval; and
    a judgment step for comparing the number of the detected flicker lines with a standard number for flicker noise judgment to judge if the object image is a flicker noise image
    wherein the output step include a first output step for outputting a first data for each line of the object image, where the first data is a statistical calculation value of brightness information of pixels corresponding to one line in the object image, and a filtering step for low-pass filtering the first data for each line,
        wherein, in the filtering step, a low-pass filtering is performed only for each of the first data corresponding to lines of a predetermined number from among lines forming the object image,
        wherein the standard number corresponds to 60% or more of a value obtained by dividing a height of the object image by a size of an interval between flicker lines.

12. The method for detecting flicker noise according to claim 11,
    wherein the output step includes:
    a standard data output step for outputting a standard data, where the standard data is a first data greater than a first data of a previous line and greater than a first data of a next line among the first data.

13. The method for detecting flicker noise according to claim 12,
    wherein, in the standard data output step, a standard data, namely, a second data greater than a second data of a previous line and greater than a second data of a next line is outputted where a second data is the low-pass filtered first data.

14. The method for detecting flicker noise according to claim 13, wherein, in the filtering step, a low-pass filtering is performed for each of the first data corresponding to at least six to eight lines among lines forming the object image.

15. The method for detecting flicker noise according to claim 12,
   wherein, in the first output step, the first data, namely, the statistical calculation value is outputted using brightness information of all pixels corresponding to one line.

16. The method for detecting flicker noise according to claim 11,
   wherein the statistical calculation value is a value obtained by dividing the sum of brightness information of pixels corresponding to one line in the object image by a number that is selected from numbers ranging from "1" to the number of pixels corresponding to one line.

17. The method for detecting flicker noise according to claim 11,
   wherein, in the case that the intervals between flicker lines are not equal to each other, the size of an interval between the flicker lines is an average value of sizes of intervals between flicker lines having nonequal intervals.

18. The method for detecting flicker noise according to claim 11,
   wherein, in the case that the intervals between flicker lines are not equal to each other, the size of an interval between the flicker lines is the size of the most frequent interval.

19. The method for detecting flicker noise according to claim 11,
   wherein, in the case that the intervals between flicker lines are not equal to each other, the number of flicker lines compared with the standard number is the sum of the numbers of flicker lines having nonequal intervals.

20. The method for detecting flicker noise according to claim 11,
   wherein, in the case that the intervals between the flicker lines are not equal to each other, the number of flicker lines compared with the standard number is the number of the flicker lines having most frequent interval.

21. A non-transitory computer readable medium stored thereon computer executable instructions for performing a method, the method comprising:
   an output step for outputting a standard data for flicker noise judgment using a statistical calculation value for each line where the statistical calculation values are calculated based on brightness information of pixels for each line of an object image;
   a flicker line detection step for detecting flicker lines by identifying lines corresponding to the standard data where the distance between the lines are within a predetermined allowance of a regular interval; and
   a judgment step for comparing the number of the detected flicker lines with a standard number for flicker noise judgment to judge if the object image is a flicker noise image,
   wherein the output step include a first output step for outputting a first data for each line of the object image, where the first data is a statistical calculation value of brightness information of pixels corresponding to one line in the object image, and a filtering step for low-pass filtering the first data for each line,
   wherein the standard number corresponds to 60% or more of a value obtained by dividing a height of the object image by a size of an interval between flicker lines.

* * * * *